Figure 1:
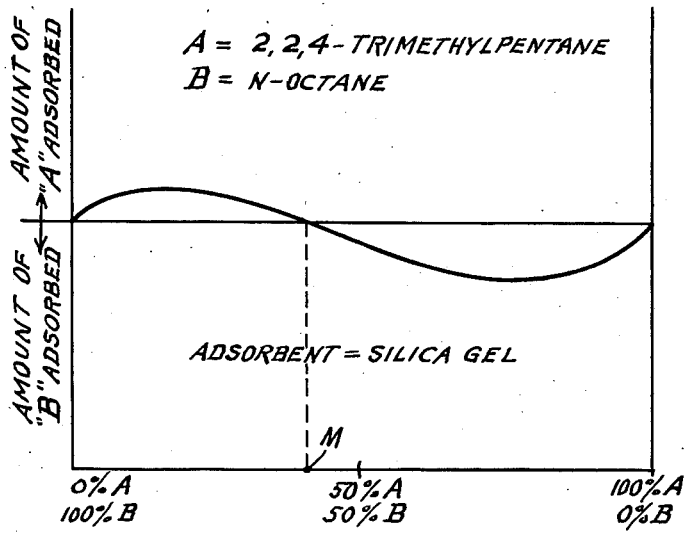

April 29, 1952     A. E. HIRSCHLER     2,594,557

PURIFICATION OF ALIPHATIC HYDROCARBONS

Filed Jan. 5, 1949     2 SHEETS—SHEET 1

INVENTOR
Alfred E. Hirschler
BY
Busser and Harding
ATTORNEYS

WITNESS:

Patented Apr. 29, 1952

2,594,557

UNITED STATES PATENT OFFICE 2,594,557

PURIFICATION OF ALIPHATIC HYDROCARBONS

Alfred E. Hirschler, Drexel Hill, Pa., assignor to Sun Oil Company, Philadelphia, Pa., a corporation of New Jersey Application January 5, 1949, Serial No. 69,343

12 Claims. (Cl. 260—676)

This invention relates to the separation of hydrocarbons of the aliphatic or paraffinic type. The invention is particularly directed to a method of preparing a paraffin hydrocarbon of high purity from a mixture containing one or more other paraffin hydrocarbons of the same molecular weight as that of the desired hydrocarbon.

In the preparation of individual hydrocarbons by organic synthesis, it is seldom that the desired hydrocarbon may be produced directly in a high state of purity. Generally a mixture of hydrocarbons is formed, which includes isomers of the desired hydrocarbon and other related compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segreate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing very closely related hydrocarbons. Usually the best that has been done from a practical aspect is to prepare hydrocarbons of technical purity, such as in concentrations in the order of 80% to 95%. To produce hydrocarbons in a high state of purity, for example in concentrations better than 95%, from mixtures containing close boiling compounds of similar hydrocarbon type heretofore has been extremely difficult and, in many cases, practically impossible.

The present invention provides an improved method whereby relatively pure hydrocarbons of the aliphatic class may be prepared. It is especially useful when the starting material contains as the impurity a minor amount of one or more related hydrocarbons boiling close to the desired compound, as when its isomers constitute the impurity. The purification is accomplished according to the invention by selective adsorption utilizing silica gel as the adsorbent.

It is well known that hydrocarbons may be separated to an extent according to chemical type by selective adsorption on silica gel or like adsorbents. This procedure has been utilized to separate aromatics and olefins from saturated hydrocarbons (i. e. naphthenes and paraffins). It is also known that two compounds of a given hydrocarbon class which have greatly different molecular weights may exhibit sufficient differences in adsorbability so that partial separation may be effected by selective adsorption. However, it has heretofore been thought that hydrocarbons of the same class which do not differ greatly in molecular weight, and particularly hydrocarbons having the same molecular weight have adsorbabilities so nearly the same that for all practical purposes no separation could be effected by adsorption.

I have found that all paraffinic hydrocarbons having the same number of carbon atoms per molecule nevertheless have sufficiently different adsorbabilities to be separable by selective adsorption on silica gel. The present invention thus provides a process for separating any two liquid paraffinic hydrocarbons of the same molecular weight. Briefly, the process comprises subjecting the mixture of such hydrocarbons to treatment in liquid phase with silica gel to selectively adsorb one of them from the charge and separating from the silica gel one or more fractions in which the proportion of the other hydrocarbon to the selectively adsorbable hydrocarbon is higher than in the starting mixture or, in other words, which contains the other paraffin in a more nearly pure state. When the paraffin which is selectively adsorbed is the hydrocarbon that is desired in pure form, it may be obtained by displacing the adsorbate from the silica gel by means of a suitable desorbing agent.

I have further found that mixtures of paraffins exhibit adsorption behaviors which may be classified in two general types. One type occurs where one of the paraffin components is selectively adsorbed from the mixture throughout a portion of the concentration range, while the other paraffin is the component which is selectively adsorbed throughout the remainder of the concentration range. Many pairs of paraffinic hydrocarbons behave in this manner. The other type occurs where one of the paraffins is the selectively adsorbable component throughout the whole concentration range. Numerous other paraffin mixtures exhibit this type of behavior.

All isomeric paraffins conform to one or the other type of behavior. It is not always possible to predict in advance which type of behavior will be exhibited by any given pair of hydrocarbons; so that in any such case if it is desired to know with certainty in advance just which type of behavior will be encountered it is necessary to predetermine the effect of proportions of the components on the relative adsorbabilities. This is not necessary in order to insure operability of the process, however, since a separation will always be effected in accordance with the invention regardless of the particular adsorption behavior of the charge components, as more fully discussed hereinafter.

The accompanying drawings are schematic illustrations of the types of behavior of hydrocarbon pairs as discussed above. The drawings depict the types of adsorption isotherms obtained for mixtures of paraffin hydrocarbon pairs throughout the complete composition range of 0 to 100% for each component. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 2:
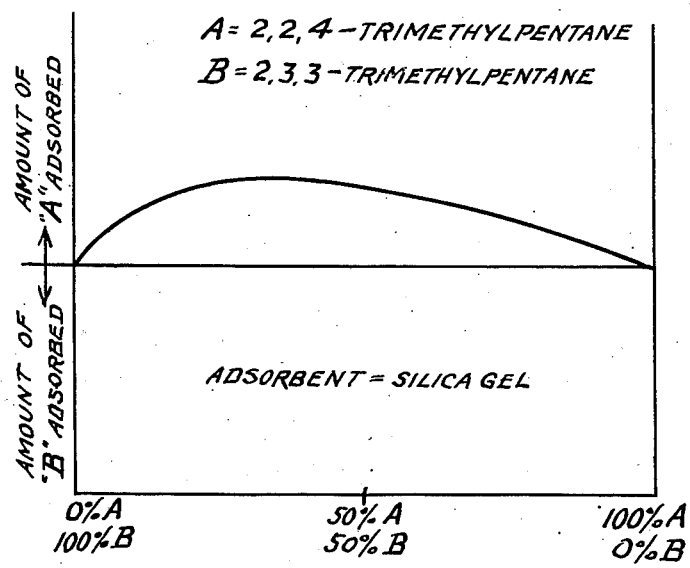
Figure 3:
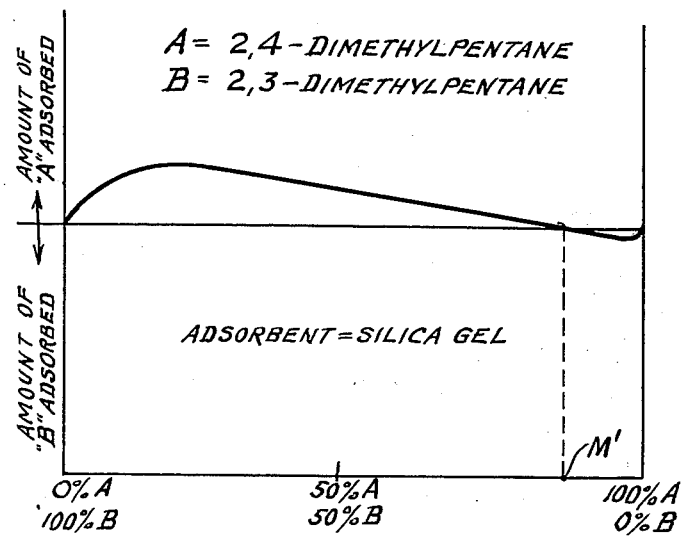

Figure 1 is representative of the type of adsorption isotherm obtained where one of the components is selectively adsorbed over part of the concentration range and the other component is selectively adsorbed over the remainder of the range. Figure 2 illustrates the adsorption isotherm where one of the components is selectively adsorbable throughout the whole concentration range. Figure 3 represents the same type of behavior as shown in Figure 1, except that one of the components is selectively adsorbed over a much wider portion of the concentration range than is the other component. Most paraffin hydrocarbons form with silica gel a system of the type illustrated by Figures 1 and 3, or in other words, exhibit a so-called S-type adsorption isotherm, as distinguished from a U-type isotherm such as shown in Figure 2.

With the type of behavior as shown in Figure 1, component A is selectively adsorbable from any mixture of the hydrocarbons, A and B, which has a composition lying between 0% A and that represented by point M which is the composition corresponding to the point where the adsorption isotherm crosses the horizontal line. On the other hand, component B is selectively adsorbable from any mixture where the proportion of A is above that represented by point M. Either component may therefore be prepared in a highly purified state, depending upon which side of point M the starting mixture composition falls. For example, by starting with a technical grade of the A component, say a mixture which contains A in a concentration of 80% or more, the mixture may be treated with silica gel to selectively adsorb B and thereby obtain A in highly purified form. Likewise, by starting with a technical grade of the B component, B may be obtained in highly purified form. I have found that with mixtures of this type the smaller the amount of the hydrocarbon present as impurity, the more easily its removal may be accomplished according to the present process. This is in contrast to other separation methods such as distillation or solvent extraction wherein the separation becomes more difficult as the amount of the impurity decreases. An example of a hydrocarbon mixture which exhibits the type of behavior shown in Figure 1 is n-octane and 2,2,4-trimethylpentane.

Where the behavior is of the type shown in Figure 2 the A component is selectively adsorbed from the mixture regardless of its concentration. When a mixture of this type is treated with silica gel, the A component will always be selectively removed, thus yielding the B component in a more nearly pure form. Also, by desorbing the A component from the used adsorbent in a suitable manner, A likewise may be obtained in purified form. An example of a mixture forming this type of system is 2,2,4-trimethylpentane and 2,3,3-trimethylpentane.

Figure 3 illustrates a system of the same type as illustrated in Figure 1 but wherein the A component is selectively adsorbable over a great part of the concentration range, for example, when its concentration lies between 0% and 90%. A mixture of this type is formed by 2,4-dimethylpentane and 2,3-dimethylpentane with the 2,4-compound corresponding to the A component. With mixtures of this type, the B component is not as readily removable when it is present in small amount as is A when it is present in low concentration. Nevertheless, B may be selectively removed when the starting mixture contains A in any proportion above that represented by point M', and the lower the concentration of B the more effective is its removal. If the concentration of B in the starting mixture is low to begin with (say 2 or 3% or the like), further effective purification of A may readily be accomplished. As previously stated, this is in contrast to other methods where further purification becomes extremely difficult when a low concentration of one of the components is reached.

It should be noted that with hydrocarbons which form the S-type adsorption isotherm (Figures 1 and 3), there is a theoretical point (M or M') at which the hydrocarbons will have the same adsorbability and therefore would not, theoretically, be separable by selective adsorption. In actual practice, however, there is no condition at which separation is absolutely incapable of being effected. There are several reasons why at least some separation will occur even with a starting mixture which approximates, as closely as possible, the composition corresponding to the aforesaid theoretical point. One is that a mixture corresponding absolutely to such point could never be encountered, due to the fact that it is a point, as distinguished from a zone, and therefore is dimensionless and can only be approximated but never exactly reached. Thus, some separation will always result, although the degree of separation might not be commercially practicable where the starting mixture composition approaches too closely to that corresponding to the theoretical point. Another reason depends upon the fact that, as I have discovered, this theoretical point changes to a substantial extent as the temperature of operation changes. In actual practice, it would never be the case that exactly the same temperature would obtain throughout the whole mass of silica gel being used to treat the starting mixture. There would always be some differences in temperature throughout the adsorbent so that some separation would necessarily result regardless of the starting mixture composition. Still another reason why a separation would always be effected to some extent is due to the fact, as I have further discovered, that the individual particles of adsorbent within any given batch of silica gel vary somewhat in adsorptive qualities. For example, it has been found that the theoretical point will be different depending upon the size of the particles segregated from a given batch of the adsorbent. Even if it were possible that the starting mixture corresponded exactly to the theoretical point for some of the particles, it would not so correspond for other particles constituting the adsorbent mass.

It is therefore apparent that regardless of what the particular proportion of paraffins in the starting mixture may be, a separation, at least to some extent, will always be effected in practicing the present process. It is impracticable to define the narrow zone on opposite sides of the theoretical point within which the process might not have a degree of utility warranting its practice on a commercial scale. The limits of such narrow zone would not be critical and would vary with starting mixtures of different paraffins and their relative proportion, and more particularly with the degree of purification desired; but as explained above the present process would always be operative to effect some worth-while degree of separation. Where the starting mixture is of the S-type and its composition is sufficiently close to the above discussed theoretical point so that treatment of the mixture does not give a commercially worth-while improvement, the degree of separation may be improved by operating at a different temperature or by first changing the composition of the starting mixture in some other manner, for example, by distillation or by adding to the mixture more of one of the constituents, after which treatment may be carried out according to the present process to effect a high degree of purification.

The type of starting mixture to which the present process usually will be applied in actual practice is one which contains the desired paraffin in more or less concentrated form initially and which contains as impurity not merely one other paraffin but a plurality of paraffins in minor amounts. For example, the charge may be a paraffinic fraction containing the desired paraffin in a concentration exceeding 80%, say 90% or 95% or the like, together with several other paraffins as impurity. As a general rule, these paraffins will boil sufficiently close to the boiling point of the desired paraffin that purification by distillation will be exceedingly difficult or substantially impossible as a practical matter. With such mixtures purification will always be effected by the present process, aside and apart from the several reasons above discussed as to why a separation will always be obtained. This is due to the fact that where there are several paraffinic impurities in the charge, the adsorption isotherm for each one with the desired paraffin will be different; so that even if the proportion of one is such that its adsorbability will not be sufficiently different from that of the desired hydrocarbon that a practicable degree of separation between the two can be effected, this will not be true as to the other paraffins present as impurity. A separation between these other paraffins and the desired paraffin will be obtained, thus yielding the desired hydrocarbon in a substantially purified form.

A preferred method of conducting the process comprises carrying out the treatment by percolating the starting mixture of hydrocarbons through a column of the adsorbent. Preferably a large proportion of adsorbent is used relative to the amount of hydrocarbon material to be treated. After all of the charge has passed into the adsorbent, it may be followed by a desorbing agent, such as a polar organic liquid (for example, alcohol or acetone) or water, to displace the adsorbate. Desorption may also be accomplished, if desired, by using a non-polar liquid such as an aromatic or a saturated hydrocarbon in sufficiently large amount to displace the adsorbate. The use of a desorbing agent is necessary where the desired component is the one which is selectively adsorbed. In the other case where the desired component is not preferentially adsorbed and therefore appears in highest purity as the first portion of efflux or filtrate from the column, a desorbing agent is not necessarily required provided sufficient charge is used to wet all of the adsorbent and produce a filtrate. In either case the efflux from the column is collected in separate fractions as desired in order to segregate the portion which has the desired purity.

With hydrocarbons that behave as illustrated in Figure 1, the first portion of efflux or filtrate will comprise the less strongly adsorbable component in a relatively high state of purity as compared to the charge. Succeeding portions will decrease in purity and, as the adsorbate is displaced from the gel, the filtrate will become less pure than the charge. However, with this type of system the component which is preferentially adsorbed will never be obtained in high concentration but only in concentrations below that represented by point M.

With the type of system as illustrated by Figure 2, the first portion of filtrate will be relatively rich, as compared to the charge, in the less adsorbable component regardless of the charge composition. Succeeding portions will become less and less rich in this component, eventually becoming enriched with respect to the more adsorbable component as it is displaced from the gel by means of the desorbing agent. Thus it is possible to obtain one component in concentrated form as the first portion of filtrate and also to obtain the other component in enriched form as the last portion of filtrate. The degree of separation will depend to some extent upon the amount of adsorbent used.

When the system is the type shown in Figure 3, the first portion of filtrate will be rich with respect to the less adsorbable component and the succeeding portions will vary in composition generally as described for systems as in Figure 1. Although it will be possible to obtain the more adsorbable component in enriched form as the last portions of filtrate, this constituent will never appear in a very high state of purity but only in concentrations which are less than that represented by point M'.

The following examples, in which percentages are given on a molar basis unless otherwise stated, illustrate the invention more specifically.

*Example I*

A sample of the best grade of synthetic normal hexane available commercially was found to contain 6 mol percent of other paraffinic material as impurity. This starting material was treated with silica gel by percolation down through a column of 1.3 inch internal diameter packed to a height of about 45 inches with 675 grams of 28–200 mesh silica gel. The column was provided with a water jacket and ice water was continuously circulated therethrough to absorb the heat generated due to wetting of the gel and to maintain the temperature substantially constant within a few degrees of ice temperature. A total of 110 ml. of the starting material was passed into the gel and this was followed by alcohol in amount sufficient to displace substantially all of the hydrocarbon from the gel. The first portion of filtrate amounting to 41 ml. or about 37% of the charge was normal hexane in a purity averaging 98 mol percent as determined by the freezing point method.

*Example II*

A sample of synthetically prepared 2,5-dimethylhexane of 90 mol percent purity was treated in the manner described in Example I, a total of 90 ml. being used as the charge. A first cut of 35 ml. of the filtrate, amounting to about 39% of the charge, was obtained in a purity of 95 mol percent. A higher purity could have been obtained by taking a smaller first cut or by retreating the first cut with regenerated gel.

*Example III*

200 ml. of n-octane containing 1.5 mol percent of paraffinic material as impurity was treated with 730 g. of 28–200 mesh silica gel. The first cut which amounted to 7% of the charge had a purity of 99.83 mol percent. The 0–60% portion of the charge had an average purity of 99.4 mol percent.

*Example IV*

The starting material was 97.2 mol percent 2,3,4-trimethylpentane containing mainly 2,3,3-trimethylpentane as the impurity. 100 ml. of this material was treated with 675 g. of silica gel as in Example I and the following results were obtained:

| Cut No. | Vol. Percent of Charge | Purity, mol Percent |
| --- | --- | --- |
| 1 | 20.0 | 99.96 |
| 2 | 20.0 | 99.90 |
| 3 | 21.0 | 99.86 |
| 4 | 21.0 | 99.82 |
| 5 | 10.0 | 99.78 |

These results show that the present method is capable of preparing an extremely pure product.

*Example V*

87 ml. of starting material containing 93 mol percent of 2,3,3-trimethylpentane was treated with 675 g. of silica gel as in previous examples. The impurities in the charge were chiefly dimethylhexanes. The first cut, amounting to 7.6% of the charge, had a purity of 99.8 mol percent.

*Example VI*

In another run in which 94 ml. of 2,3,3-trimethylpentane having a purity of 94 mol percent and containing 2,3,4-trimethylpentane as the main contaminant was treated in the above manner, it was found that the first cut representing 10.6% of the charge was 99.5 mol percent pure. A later cut between the percentages of 32–42.5% was 98.0 mol percent pure. By comparing this example with Example V, it may be seen that these two paraffins behave in the manner illustrated by Figure 1.

*Example VII*

A column having an internal diameter of about ½ inch and a height of 3 feet was used. The column was provided with a water jacket through which ice water was circulated. 50 ml. of a mixture composed of 90% 2,3,3-trimethylpentane and 10% 2,2,4-trimethylpentane was treated with 84 g. of silica gel by percolation through the column. The behavior of these components is illustrated in Figure 2. The charge was followed by alcohol in order to force the hydrocarbon through the gel. The first portion of filtrate amounting to 20% of the charge was 98% pure 2,3,3-trimethylpentane. 72% of the charge was obtained as filtrate having a purity higher than that of the charge.

*Example VIII*

In another run carried out as in Example IX using the same amounts of charge and gel, a mixture of 90% 2,2,4-trimethylpentane and 10% n-octane yielded a first cut, amounting to 20% of the charge, which was better than 99.5% pure 2,2,4-trimethylpentane. These components are the ones upon which Figure 1 is based.

*Example IX*

This run differed from the previous one only in that the charge composition was reversed so that it was composed of 90% n-octane and 10% 2,2,4-trimethylpentane. The first fraction of filtrate comprising 10% of the charge was 95% pure n-octane.

*Example X*

This run was carried out by percolating 24 ml. of a mixture composed of 90% 2,2,3-trimethylbutane and 10% 2,4-dimethylpentane through 84 g. of silica gel as in Example IX. The first 10 ml. of filtrate, or about 42% of the charge, was the 2,2,3-compound in a purity better than 99.5%.

*Example XI*

The charge was n-heptane containing 5% 2,4-dimethylpentane. 25 ml. of the charge was passed through 80 g. of silica gel as in Example IX. The first cut amounting to 16% contained 2% 2,4-dimethylpentane as impurity.

*Example XII*

This run differed from the previous run only in that the charge composition was reversed, the charge being 2,4-dimethylpentane containing 5% n-heptane. Two 12% cuts of the first portion of filtrate were separated and these contained 1.7% and 3.4%, respectively, of n-heptane as impurity.

*Example XIII*

In this run 24 ml. of n-heptane containing 5% 2,3-dimethylpentane was percolated through 80 g. of silica gel as in Example IX. Two cuts were taken, each representing about 17% of the charge, and these were found to be 98.5% and 96% pure, respectively.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

This application is a continuation-in-part of my co-pending application Serial No. 643,762, filed January 26, 1946, now abandoned.

Having described my invention, what I claim and desire to protect by Letters Patent is:

1. A process of separating two paraffin hydrocarbons having the same molecular weight which comprises subjecting a saturate mixture of such hydrocarbons to treatment in liquid phase with an adsorbent consisting essentially of silica gel, thereby selectively adsorbing one of said hydrocarbons, and separating from the silica gel a fraction containing the other hydrocarbon in a more nearly pure state.

2. A process according to claim 1 wherein said paraffin hydrocarbons are each isoparaffins.

3. A process for purifying a paraffin hydrocarbon which contains in admixture therewith a small amount of another paraffin hydrocarbon of the same molecular weight which comprises subjecting a saturate mixture of said hydrocarbons to treatment in liquid phase with an adsorbent consisting essentially of silica gel, thereby selectively adsorbing said other hydrocarbon which is present in small amount, and separating from the silica gel a fraction containing the desired paraffin hydrocarbon in relatively pure state.

4. A process according to claim 3 wherein said paraffin hydrocarbons are each isoparaffins.

5. The process of separating two isomeric paraffin hydrocarbons from a saturate mixture containing them, which hydrocarbons are present in such proportion as to have substantially different adsorbabilities, which comprises subjecting such mixture to treatment in liquid phase with an adsorbent consisting essentially of silica gel, thereby selectively adsorbing one of said hydrocarbons and separating from the silica gel a fraction containing the other hydrocarbon in a more nearly pure state.

6. In a process of separating a saturate liquid hydrocarbon mixture comprising two isomeric paraffin hydrocarbons and in which the two hydrocarbons have different adsorbabilities when they are present within a certain range of proportions, the steps which comprise subjecting such mixture in which the proportions of said paraffin hydrocarbons are within such proportion range to treatment in liquid phase with an adsorbent consisting essentially of silica gel, thereby selectively adsorbing one of said hydrocarbons, and separating from the silica gel a fraction containing the other hydrocarbon in more nearly pure form.

7. In a process of separating a saturate liquid hydrocarbon mixture comprising two paraffin hydrocarbons, A and B, of the same molecular weight and in which hydrocarbon A has a greater adsorbability than hydrocarbon B when A is present in small amount, the steps which comprise subjecting such mixture containing a small amount of A and a large amount of B to treatment in liquid phase with an adsorbent consisting essentially of silica gel, thereby selectively adsorbing hydrocarbon A, and separating from the silica gel a fraction containing hydrocarbon B in a relatively pure state.

8. In a process of separating a saturate liquid hydrocarbon mixture comprising two paraffin hydrocarbons, A and B, of the same molecular weight and in which hydrocarbons A and B have essentially the same adsorbability when they are present in a certain definite proportion, the steps which comprise subjecting such mixture of said paraffin hydrocarbons in which the proportion of A to B is substantially less than such definite proportion to treatment in liquid phase with an adsorbent consisting essentially of silica gel, thereby selectively adsorbing hydrocarbon A, and separating from the silica gel a fraction containing hydrocarbon B in a relatively pure state.

9. A process according to claim 8 in which the two paraffin hydrocarbons are each branched chain paraffins.

10. A process according to claim 8 in which the hydrocarbon A is a branched chain paraffin and hydrocarbon B is a straight chain paraffin.

11. A process for purifying a paraffin hydrocarbon which contains in admixture therewith as impurity another paraffin hydrocarbon of the same molecular weight, said paraffins having the same adsorbability when admixed in a certain definite proportion, which comprises introducing a saturate mixture of said paraffins containing the desired paraffin in major proportion substantially in excess of said certain definite proportion in liquid phase into a body of adsorbent consisting essentially of silica gel, thereby selectively adsorbing the paraffin which is present as impurity, and separating from the silica gel a filtrate fraction which contains only a portion of the total hydrocarbons introduced, thereby obtaining the desired paraffin in more nearly pure state.

12. A process for purifying a paraffin hydrocarbon which contains in admixture therewith as impurity less than 20% of an isomeric paraffin hydrocarbon, said paraffins having the same adsorbability when admixed in a certain definite proportion, which comprises introducing a saturate mixture of said paraffins containing the second-named paraffin in a proportion substantially less than said certain definite proportion in liquid phase into a body of adsorbent consisting essentially of silica gel, thereby selectively adsorbing the second-named paraffin, and separating from the silica gel a filtrate fraction which contains only a portion of the total hydrocarbons introduced, thereby obtaining the first-named paraffin in more nearly pure state.

ALFRED E. HIRSCHLER.

REFERENCES CITED

The following references are of record in the file of this patent:

UNITED STATES PATENTS

| Number | Name | Date |
|---|---|---|
| 2,306,610 | Barrer | Dec. 29, 1942 |
| 2,425,535 | Hibshman | Aug. 12, 1947 |
| 2,442,191 | Black | May 25, 1948 |

OTHER REFERENCES

Mair et al., Oil & Gas J., Sept. 19, 1935, pages 29, 30 and 32.